(12) United States Patent
Schachter

(10) Patent No.: US 7,870,475 B2
(45) Date of Patent: Jan. 11, 2011

(54) SYSTEM AND METHOD FOR BOOKMARKING AND TAGGING A CONTENT ITEM

(75) Inventor: Joshua Schachter, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1021 days.

(21) Appl. No.: 11/435,557

(22) Filed: May 16, 2006

(65) Prior Publication Data

US 2007/0271498 A1     Nov. 22, 2007

(51) Int. Cl.
     *G06F 17/00*      (2006.01)

(52) U.S. Cl. ........................ 715/206; 715/273

(58) Field of Classification Search ............. 715/205, 715/206, 207, 208, 273
See application file for complete search history.

(56) References Cited

U.S. PATENT DOCUMENTS

| | | | | |
|---|---|---|---|---|
| 6,247,021 B1* | 6/2001 | Himmel et al. | | 1/1 |
| 6,324,566 B1* | 11/2001 | Himmel et al. | | 709/203 |
| 6,546,393 B1* | 4/2003 | Khan | | 707/10 |
| 6,832,350 B1* | 12/2004 | Bates et al. | | 715/206 |
| 7,010,748 B1* | 3/2006 | Minenko et al. | | 715/739 |
| 7,143,353 B2* | 11/2006 | McGee et al. | | 715/723 |
| 7,205,471 B2* | 4/2007 | Looney et al. | | 84/615 |
| 7,290,213 B2* | 10/2007 | Kake et al. | | 715/738 |
| 2002/0015042 A1* | 2/2002 | Robotham et al. | | 345/581 |
| 2002/0035609 A1* | 3/2002 | Lessard et al. | | 709/217 |
| 2002/0054090 A1* | 5/2002 | Silva et al. | | 345/747 |

* cited by examiner

*Primary Examiner*—Laurie Ries
(74) *Attorney, Agent, or Firm*—Seth H. Ostrow; Ostrow Kaufman LLP

(57) ABSTRACT

The present invention is directed towards systems and methods for saving and tagging a content item available on a computer network, including saving and bookmarking a reference to a content item. According to one embodiment of a method according to the present invention, a user navigates to a content item and selects a control to save a bookmark to the content item. A bookmarking and tagging server receives one or more items of tag information that are related to the bookmarked content item, which are saved in conjunction with the one or more items of tag information.

30 Claims, 9 Drawing Sheets

SYSTEM AND METHOD FOR BOOKMARKING AND TAGGING A CONTENT ITEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention generally provides methods and systems for saving references to content items. More specifically, the present invention provides methods and systems for selecting a control presented in conjunction with a content item for saving a reference to the content item over a network to a bookmarking and tagging service provider.

A number of techniques are known to those of skill in the art for saving references to content items. One example is a bookmark control available by most popular web browsers. A user utilizes a web browser to view content items, including content items available over a network, such as the Internet. When the user navigates to a content item to which he or she wishes to save a reference, the user utilizes a bookmark control from the web browser to save a reference to the content item. For example, where a given content item is identified by an address, such as a URL, the browser saves a local reference to the content item that includes the address of the content item. When the user wishes to subsequently view the content item, the user may select the locally saved reference to the content item, causing the browser to retrieve the content item that the address identifies.

There are a number of shortcomings associated with presently known techniques for saving references to content items. One shortcoming is that references to content items are saved locally on a workstation of a given user and are not available to the user when away from the workstation. Similarly, there are currently no mechanisms that allow a user to save a reference to content item that is accessible from a variety of workstations at geographically disparate locations. Also, there are no systems and methods that allow for a user to save a reference to a content item directly from a given content item or browser to a bookmarking and tagging service provider.

Thus systems and methods are needed to allow a given user to remotely save references to content items, the references available to the given user from a plurality of geographically disparate workstations. Systems and methods are further needed that allow the given user to remotely save references to content items from within the browser, or from within a given content item.

SUMMARY OF THE INVENTION

The present invention provides systems and method for saving and tagging content items available on a computer network. A method according to one embodiment of the present invention comprises navigating to a content item available over a computer network and selecting a control to save a bookmark to the content item. One or more items of tag information that are related to the bookmarked content item are received. Items of tag information may also describe the bookmarked content item. The bookmarked content item is saved in conjunction with the one or more items of tag information.

Navigating may comprise the utilization of a web browser at a client device to navigate among web pages available on the computer network. The browser may utilize any number of addressing schemes know to those of skill in the art to identify and navigate to the content items available on the computer network, for example, a uniform resource locator ("URL"). The browser may comprise a control, the selection of which saves a bookmark to a given content item.

Navigation may comprise navigating to a content item that is a web page. Other content items also fall within the scope of the present invention including, but not limited to, audio files, video files, image files, etc. (including combinations thereof). According to one embodiment, selecting the control comprises selecting a control presented as part of the content item, such as a button or other control provided as part of a web page. Selecting the control may pass an address of the content item to a bookmarking and tagging service provider for storage, which may comprise passing a URL that identifies the content item to a bookmarking and tagging service provider for storage. Furthermore, selecting the control may comprise encoding a URL for the content item into a URL that identifies a bookmarking and tagging service provider and parsing the encoded URL at the bookmarking and tagging service provider for storage.

Embodiments of methods according to the present invention may comprise receiving authentication information that identifies a user. If the authentication information that identifies the user is valid, providing the user is provided with access to a bookmarking and tagging service provider. If, however, the authentication information that identifies the user is no valid, the user is prevented from access to the bookmarking and tagging service provider. The step of saving may comprise saving in conjunction with information that identifies an account for the user.

Embodiments of methods according to the present invention may also comprise suggesting items of tag information for association with a given content item. According to one embodiment, the method comprises the steps of receiving a portion of an item of tag information and providing one or more suggested items of tag information on the basis of the received portion. When suggesting one or more items of tag information, the user may select a given one of the one or more items of tag information. Suggesting may also comprise suggesting a popular tag. Alternatively, or in conjunction with the foregoing, suggesting may comprise suggesting one or more items of tag information previously provided by a user.

In addition to provide one or more items of tag information, embodiments of the method comprise providing description information with regard to the content item and saving the description information, which may be saved in conjunction with the bookmarked content item and one or more items of tag information. Providing may comprise extracting the description information from the content item. Additionally, the method may comprise providing notes information with regard to the content item and saving the notes information, which may be saved in conjunction with the bookmarked content item and one or more items of tag information.

In addition to the foregoing, the present invention is directed towards a system for saving and tagging a content item available on a computer network. According to one embodiment, the system comprises a client device that is operative to navigate to a content item available over a computer network and provide a control to generate a request to bookmark the content item. A bookmarking and tagging service provider is operative to receive the bookmark request from the client device and one or more items of tag information that are related to the content item. A bookmark and tag data store, which may be a relational database, receives bookmark and tag information from the bookmarking and tagging service provider for storage of the bookmark for the content item in conjunction with the one or more items of tag information.

According to one embodiment, the client device comprises a web browser to navigate to a content item, which may be a web page that is identified by an address. Content items may be located using addressing schemes known to those of skill in the art, e.g., by utilizing a URL. The URL of the content item may be embedded in the bookmark request, such as by inclusion into a URL that identifies the bookmarking and tagging service provider. Accordingly, the bookmarking and tagging service provider may parse the bookmark request to retrieve the URL of the content item for storage in the bookmark and tag data store.

According to some embodiments, the bookmarking and tagging service provider is operative to suggest one or more items of tag information on the basis of the receipt of one or more items of tag information. Similarly, the bookmarking and tagging service provider may suggest one or more items of tag information on the basis of the content item. Alternatively, or in conjunction with the foregoing, the bookmarking and tagging service provider is operative to suggest one or more items of tag information on the basis one or more items of tag information associated with the content item.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
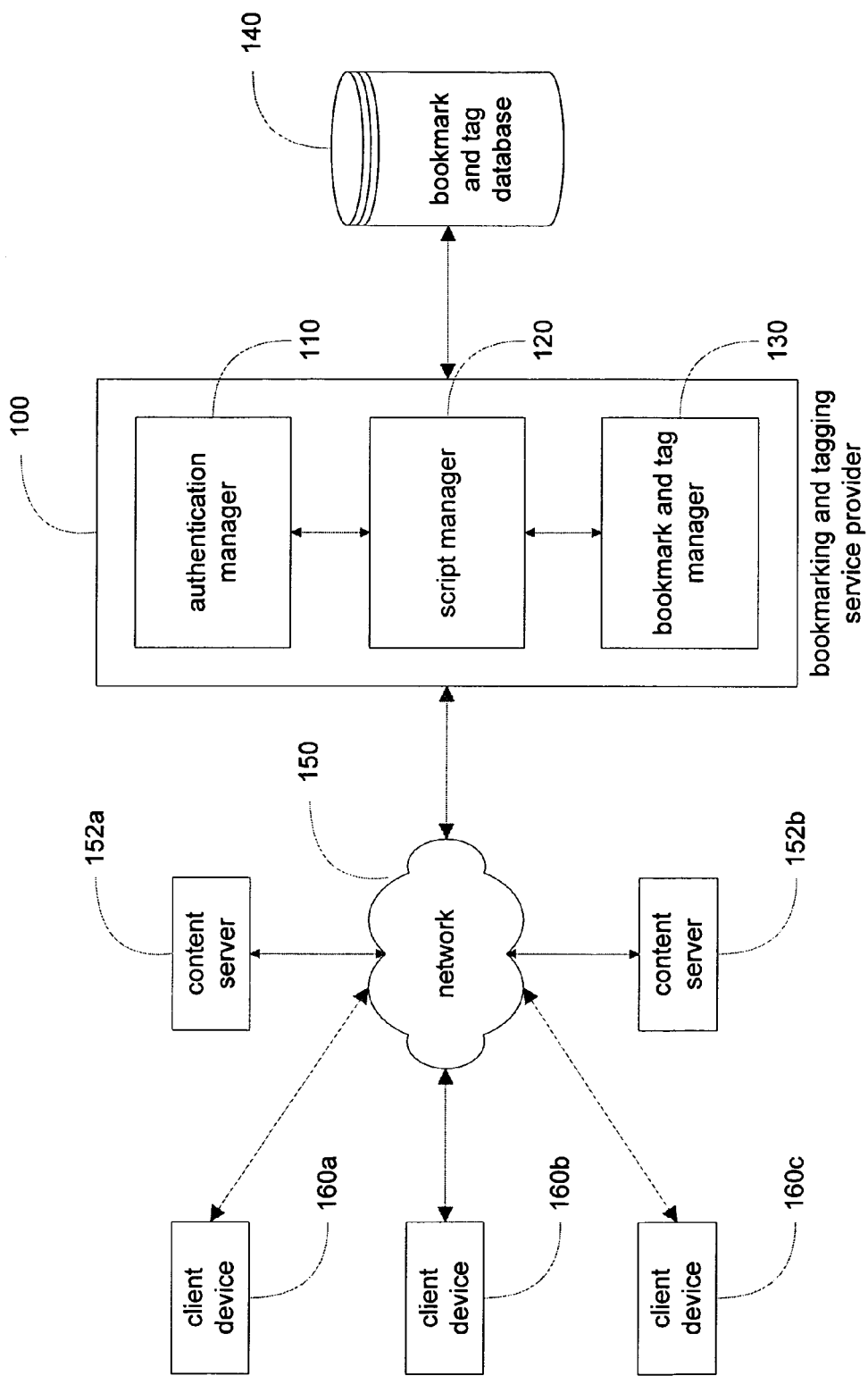
FIG. 1 is a block diagram presenting a system for bookmarking content items and receiving and storing bookmark information and tag information associated with bookmarked content items according to one embodiment of the present invention.

FIG. 1 presents a block diagram illustrating one embodiment of a system for bookmarking content items and receiving and storing tag information relating to bookmarked content items. According to the embodiment of FIG. 1, a bookmarking and tagging service provider 100 comprises one or more software and hardware components to facilitate bookmarking and tagging content items available from one or more content servers 152a and 152b, hereinafter identified as content server 152. The content items may be, for example, web pages, text documents, audio files, video files, multimedia files, or any other form of digital content accessible over a network.

The software and hardware components comprising bookmarking and tagging service provider 100 may include, but are not limited to, an authentication manager 110, a script manager 120, and a bookmark and tag manager 130. The bookmarking and tagging service provider 100 also comprises one or more data stores for providing persistent storage of information used in bookmarking and tagging content items as well as providing access to stored bookmark information and tag information. Such data stores may include, but are not limited to, a bookmark and tag database 140. Bookmark and tag database 140 may be implemented, for example, as a relational database wherein individual registered users may be associated with bookmark information and with tag information. The bookmark and tag database 140 may also be implemented utilizing other data storage techniques know to those of skill in the art, e.g., an object-oriented database, a hybrid object-relational database, etc.

The bookmarking and tagging service provider 100 is communicatively coupled to a network 150, which may include a connection to one or more local and/or wide area networks, such as the Internet. The bookmarking and tagging service provider 100 receives commands from client devices 160a, 160b, and 160c, hereinafter identified as client device 160, communicatively coupled to network 150. Client device 160 may be any device that allows for the transmission of bookmarking and tagging requests to a bookmarking and tagging service provider 100, where the bookmarking and tagging requests may include retrieval and modification of stored bookmark information and stored tag information. According to one embodiment of the invention, a given client device 160 may be a general purpose computer comprising a processor, transient and persistent storage devices, an input/output subsystem, and a bus to provide a communications path among components comprising the general purpose computer. Client device 160 also has a network interface to the network 150, such as a wired or wireless Ethernet interface. Client device 160 typically runs software applications (such as web browsing applications) that allow for access to content items served by content server 152 and that allow transmission of bookmarking and tagging requests, which may include allowing for the retrieval and modification of stored bookmarks and stored tag information.

The bookmarking and tagging service provider 100 receives requests from a client device 160 to bookmark and tag content items available from a content server 152. For example, an individual user who is using client device 160 may use a web browser to navigate to a content item that a content server 152 hosts. The user sends a request to the bookmarking and tagging service provider 100 to bookmark the content item and to add tag information associated with the bookmarked content item. Bookmarking and tagging service provider 100 receives and processes the request. According to one embodiment, a bookmark is associated with a given content item and comprises bookmark information and any associated tag information. Bookmark information is associated with content items, and may include, but is not limited to, identifying information and descriptive information regarding a given content item. Tag information may be associated with a content item, and may include, but is not limited to, user-defined information such as keywords or other descriptors regarding the content item.

An authentication manager 110 may uniquely identify and authenticate an individual registered user who is using a client device 160 to generate a bookmarking and tagging request. Authentication manager 110 may perform such identification and authentication, for example, by accessing a cookie, a certificate, or other machine-readable file from the client device 160. Authentication manager 110 may also perform identification and authentication by receiving information from a user, for example, through a login or registration procedure.

A bookmark and tag manager 130 associates registered users with bookmarking and tagging requests that the bookmarking and tagging service provider 100 receives. Bookmark and tag manager 130 also associates incoming requests with bookmarks and tag information previously stored in bookmark and tag database 140. Bookmark and tag manager 130 may also associate bookmarks with registered users as well as with tag information previously stored in bookmark and tag database 140. Similarly, bookmark and tag manager 130 may also associate tag information with registered users as well as with bookmarks previously stored in bookmark and tag database 140.

Bookmark and tag database 140 is operative to maintain bookmarks associated with each registered user of bookmarking and tagging service provider 100. A bookmark is associated with a given content item and comprises bookmark information and any associated tag information. Bookmark information is associated with content items, and may include, but is not limited to, identifying information and descriptive information regarding a given content item. Content identifying information may include, but is not limited to, an address such as the universal resource locator (URL) for a content item. Content descriptive information may include, but is not limited to, descriptive information added by a content provider such as a title to a web page or other metadata, other descriptive information not added by a content provider such as a filename or a file attribute, and user-defined descriptive information. Tag information may be associated with a content item, and may include, but is not limited to, user-defined information such as words or other descriptors regarding the content item. Bookmark and tag database 140 associates tag information with bookmarks, with bookmarked content items, and with bookmark information.

Bookmark and tag database 140 is also operative to maintaining a tag space for each bookmarked content item. According to one embodiment, a tag space comprises a collection of tag information associated with a given content item. The tag space for a given content item may comprise a collection of all of the tag information associated with all of the bookmarks stored in bookmark and tag database 140 which are associated with the given content item. For example, one or more registered users may create a set of bookmarks for a given content item. Each bookmark in the set, though associated with the same given content item, may be associated with different tag information. The collection of all of the tag information associated with each bookmark in the set comprises the tag space for the given content item. Those of skill in the art recognize that the converse holds true as well, e.g., a given tag may have an associated bookmark space on the basis of tags utilizing the given bookmark.

A script manager 120 is communicatively coupled with the authentication manager 110 and the bookmark and tag manager 130. The script manager 120 may issue commands to authentication manager 110 and bookmark and tag manager 130 to facilitate identifying and authenticating a registered user, receiving bookmarking and tagging requests from the registered user, as well as storing, accessing, and modifying bookmarks and tag information associated with one or more registered users. For example, script manager 120 may receive a bookmarking and tagging request when a user operating a web browser on a client device 160 navigates to a content item a content server 152 is hosting. Script manager 120 may receive such a request, for example, when a user clicks on a hyperlink or a button added to a web page by a content provider. Script manager 120 may also receive a bookmarking and tagging request, for example, when a user clicks on a browser button or enables a browser extension.

Script manager 120 issues commands to authentication manager 110 to identify and authenticate the user. Once authentication manager 110 identifies and authenticates a user, bookmark and tagging service provider 100 recognizes the user as a registered user. Script manager 120 may issue commands to bookmark and tag manager 130 to receive bookmark information and tag information from the registered user. Script manager 120 may also issue commands to bookmark and tag manager 130 to associate bookmarks and tag information with the registered user as well as to store, access, and modify bookmarks and tag information associated with the registered user.

Figure 2:
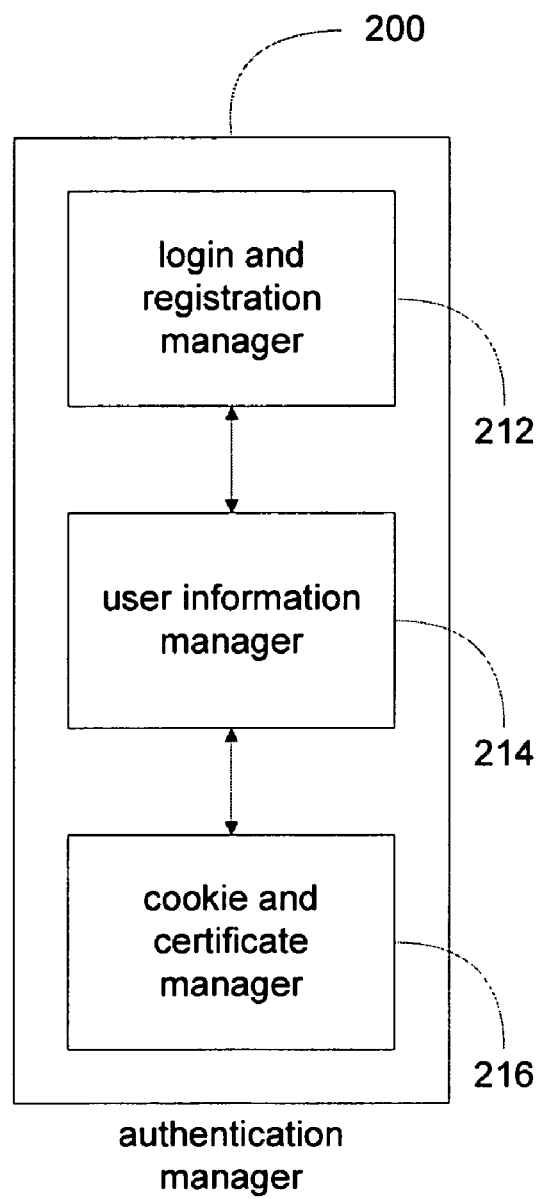
FIG. 2 is a block diagram presenting an authentication manager according to one embodiment of the present invention.

FIG. 2 presents an authentication manager according to one embodiment of the present invention. According to the embodiment of FIG. 2, an authentication manager 200 comprises one or more software and hardware components to facilitate identifying and authenticating a registered user of a bookmarking and tagging service provider 100. The software and hardware components comprising authentication manager 200 may include, but are not limited to, a login and registration manager 212, a user information manager 214, and a cookie and certificate manager 216.

A login and registration manager 212 processes login requests from registered users of bookmarking and tagging service provider. For unregistered users of bookmarking and tagging service provider, login and registration manager 212 also processes registration requests to allow a new user to register with bookmarking and tagging service provider. For example, login and registration manager 212 may present a user with a form on a web page to allow the user to enter user information or to register for an account with the bookmarking and tagging service provider. Alternatively, login and registration manager may receive user information from a physical token such as, for example, via an interface to a card reader or biometric device coupled to a client device.

A cookie and certificate manager 216 manages user cookies and certificates to identify and authenticate registered users and to track whether a registered user is logged in to an account with bookmarking and tagging service provider. For example, cookie and certificate manager 216 may maintain a text file, digital signature, electronic certificate, or other machine-readable file accessible from a client device of a registered user. The cookie or certificate may contain, for example, user information including, but not limited to, a user ID, a client device ID, a password, public key, or other identifying information. Cookie and certificate manager 216 may update the cookie or certificate, for example, according to whether a registered user is logged in to an account with the bookmarking and tagging service provider.

A user information manager 214 is communicatively coupled with the login and registration manager 212 and the cookie and certificate manager 216. User information manager 214 maintains user information associated with each registered user and may issue commands to login and registration manager 212 and to cookie and certificate manager 216 to facilitate processing login and registration requests as well as maintaining user cookies and certificates.

Figure 3:
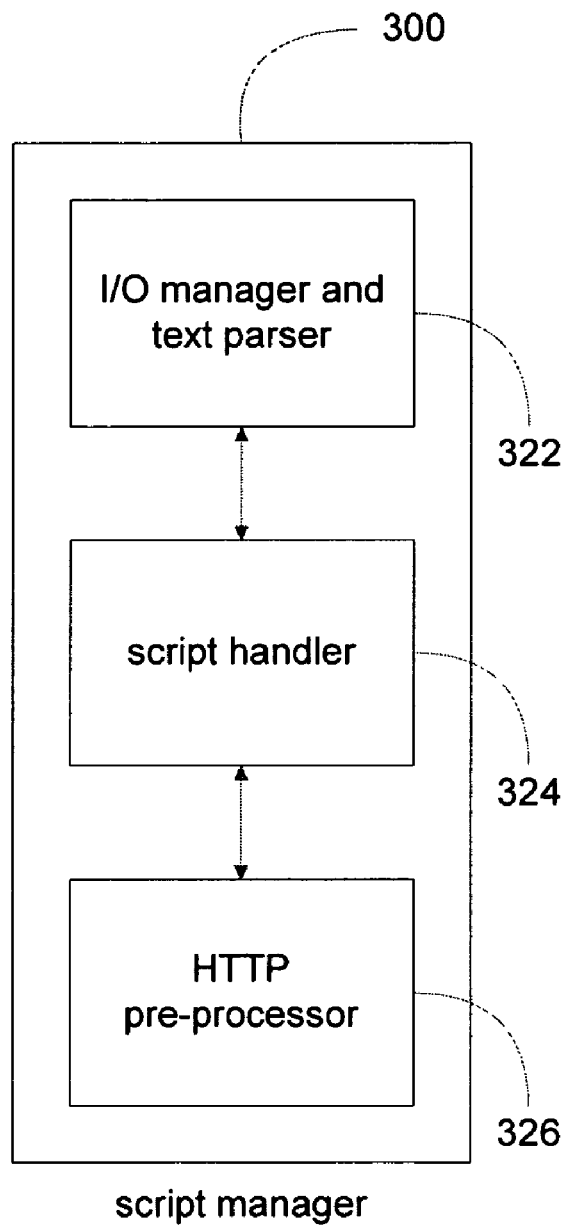
FIG. 3 is a block diagram presenting a script manager according to one embodiment of the present invention.

FIG. 3 presents a script manager according to one embodiment of the present invention. According to the embodiment of FIG. 3, a script manager 300 comprises one or more software and hardware components to facilitate receiving and parsing input from a user, handling script execution, and dynamically generating web pages. The software and hardware components comprising script manager 300 may include, but are not limited to, an input/output (I/O) manager and text parser 322, a script handler 324, and an HTTP pre-processor 326.

An input/output (I/O) manager and text parser 322 receives and processes input from users of bookmarking and tagging service provider, and parses received input. I/O manager and text parser 322 also processes output from bookmarking and tagging service provider for display to a user. A hypertext transfer protocol (HTTP) pre-processor 326 receives and processes HTTP requests for dynamically creating web pages served by bookmarking and tagging service provider 100. HTTP pre-processor 326 may receive commands, for example, to dynamically create forms for a user to fill in during a login, registration, or a bookmarking and tagging procedure.

A script handler 324 is communicatively coupled to the I/O manager and text parser 322 and the HTTP pre-processor 326. Script handler 324 may issue commands to I/O text manager and text parser 322 to receive and process input from a user and to parse received input. Script handler 324 may also issue commands to I/O manager and text parser 322 to format output from bookmarking and tagging service provider for display to a user. Script handler 324 may also issue commands to HTTP pre-processor 326 to dynamically create web pages during a login, registration, or a bookmarking and tagging procedure.

Figure 4:
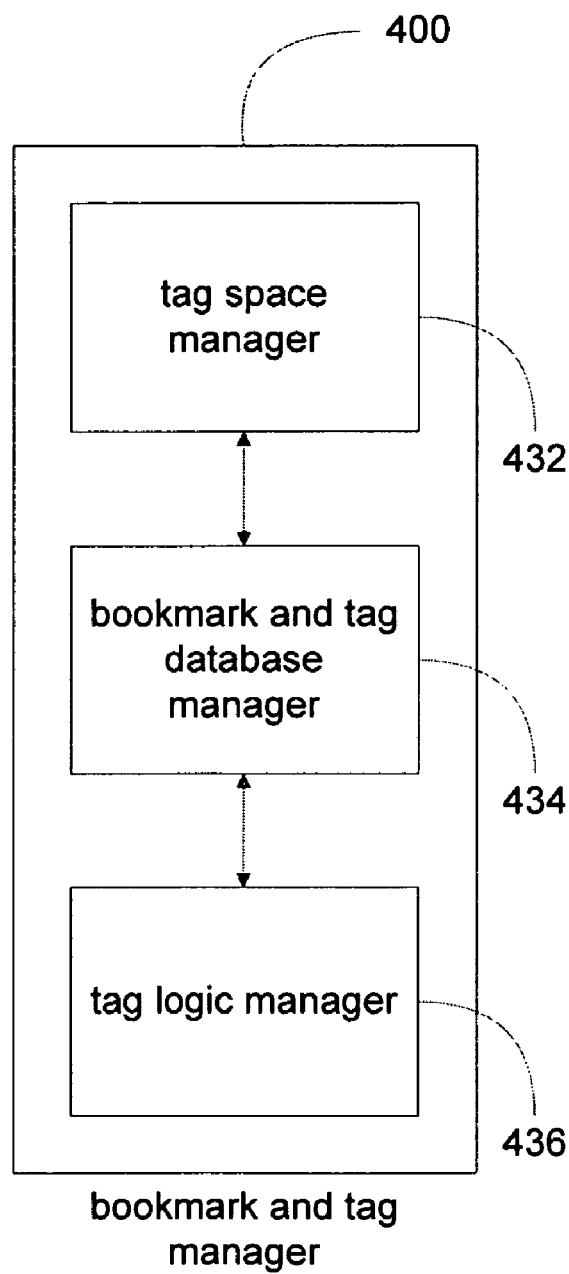
FIG. 4 is a block diagram presenting a bookmark and tag manager according to one embodiment of the present invention.

FIG. 4 presents a bookmark and tag manager according to one embodiment of the present invention. According to the embodiment of FIG. 4, a bookmark and tag manager 400 comprises one or more software and hardware components to facilitate associating bookmarks and tag information with registered users, storing and accessing and modifying bookmark information and tag information, and making suggestions for tag information. The software and hardware components comprising bookmark and tag manager 400 may include, but are not limited to, a bookmark and tag information manager 432, a bookmark and tag database manager 434, and a tag logic manager 436.

A bookmark and tag information manager 432 associates bookmarks and tag information with each registered user of bookmark and tagging service provider. For example, for each registered user, bookmark and tag information manager 432 may maintain a set of bookmarks associated with the registered user. This set of bookmarks comprises the registered user's bookmark collection. Bookmark and tag information manager may also maintain a set of tag information associated with each of the bookmarks in the registered user's bookmark collection. Bookmark and tag information manager 432 may also maintain a set of tag information associated with one or more of the bookmarks in a registered user's bookmark collection. This set of tag information comprises the registered user's tag collection.

Bookmark and tag information manager 432 may further maintain a set of the tag information associated a given bookmarked content item, which may include tag information associated with one or more registered users of bookmarking and tagging service provider. For example, one or more registered users may bookmark the same content item, and each of these registered users may have associated with the bookmarked content item individual bookmark information and tag information. According to one embodiment, the set of the tag information associated with a bookmarked content item across all registered users of a bookmarking and tagging service provider comprises the tag space associated with the bookmarked content item.

A tag logic manager 436 makes suggestions for tag information for a given bookmark. For example, tag logic manager 436 may suggest tag information based on the tag space associated with a particular bookmarked content item. When bookmarking and tagging service provider receives from a registered user a bookmarking and tagging request that involves adding or modifying bookmark information and tag information for a given content item, tag logic manager 436 may suggest tag information based on the tag space associated with the bookmarked content item. The suggested tag information may be, for example, previously stored in and retrieved from bookmark and tag database. Alternatively, tag logic manager 436 may maintain a dictionary of tag information and may suggest tag information from that dictionary. For example, when a user begins entering tag information during a bookmarking and tagging request involving adding or modifying bookmark information and tag information, tag logic manager 436 may employ a pattern-matching process or a text-predictive process to suggest tag information. The tag logic manager may also utilize heuristics to suggest relevant or related tags.

A bookmark and tag database manager 434 is communicatively coupled with the bookmark and tag information manager 432 and the tag logic manager 436. Bookmark and tag database manager 434 processes commands from bookmark and tag information manager 432 and tag logic manager 436 to perform read, write, and lookup functions from a bookmark and tag database. For example, bookmark and tag database manager 434 may process commands from bookmark and tag information manager 432 to perform database reading and lookup functions in order to present the tag space associated with a bookmarked content item. When bookmark information and tag information are added or modified, bookmark and tag database manager 434 may receive commands from bookmark and tag information manager 432 to perform database writing functions in order to update the records stored in bookmark and tag database 140. Bookmark and tag database manager 434 also receives commands to perform read and lookup functions from tag logic manager 436. For example, when tag logic manager 436 makes suggestions for tag information, bookmark and tag database manager 434 may receive commands to perform read and lookup functions in order to present the tag space associated with a bookmarked content item and to perform a pattern-matching or text-predictive process.

Figure 5:
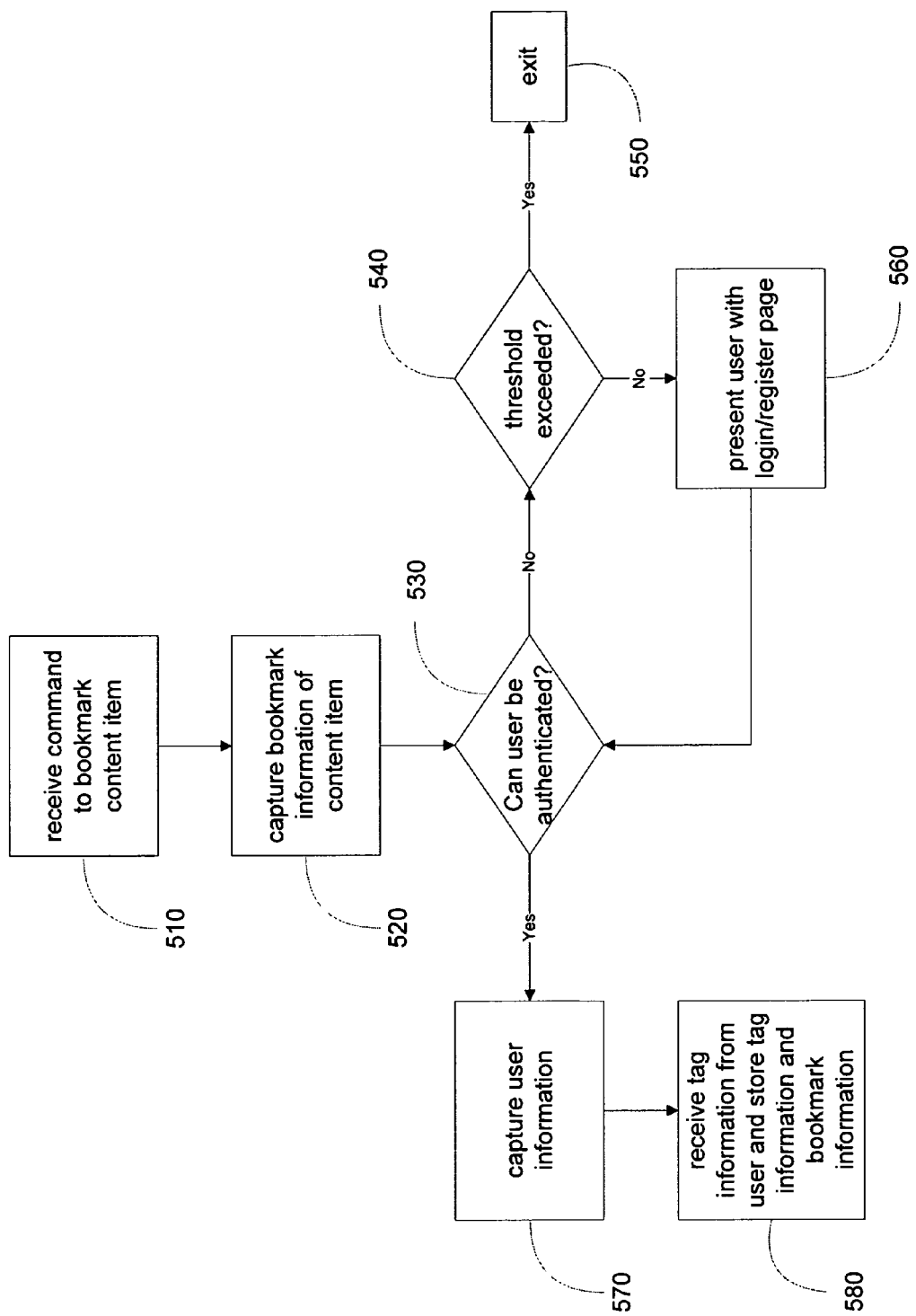
FIG. 5 is a flow diagram presenting a method for bookmarking a content item and receiving and storing tag information related to bookmarked content items according to one embodiment of the present invention.

FIG. 5 presents a flow diagram illustrating one embodiment of a method for bookmarking a content item as well as adding and storing tag information. According to the method of FIG. 5, a bookmarking and tagging service provider receives a command to bookmark a content item at step 510. A content item may be a web page, text document, audio file, video file, multimedia file, or any other form of digital content accessible over a network. The bookmark and tagging service provider may receive the command to bookmark a content item, for example, when a user clicks on a button or a hyperlink added to a web page by a content provider, where the button or hyperlink may be linked, for example, to an HTTP request to initiate a connection with a bookmark and tagging service provider or to execute a script served by the bookmarking and tagging service provider. Alternatively, the bookmarking and tagging service provider may receive a command to bookmark a content item, for example, when a user clicks on a browser button or activates a browser extension, where the browser button or browser extension is similarly linked to an HTTP request to initiate a connection with a bookmark and tagging service provider or to execute a script served by the bookmarking and tagging service provider.

At step 520, the bookmarking and tagging service provider captures bookmark information, such as content identifying information. Bookmark information is associated with content items, and may include, but is not limited to, content identifying information and content descriptive information regarding a given content item. Content identifying information may include, but is not limited to, an address such as the universal resource locator (URL) for a content item. Content descriptive information may include, but is not limited to, descriptive information added by a content provider such as a title to a web page or other metadata, other descriptive information not added by a content provider such as a filename or a file attribute, and user-defined descriptive information. At step 520, the bookmarking and tagging service provider, for example, may capture content identifying information such as the URL of the content item and save the URL in a temporary data store.

At step 530, the bookmarking and tagging service provider attempts to authenticate the user as a registered user. The bookmarking and tagging service provider may authenticate a registered user according to a number of techniques. For example, the bookmarking and tagging service provider may check the user's client device for a cookie, certificate, or other electronic token or file containing identifying and authenticating information, including, but not limited to, a user ID, a client device ID, a password, or public key.

If the bookmarking and tagging service provider cannot authenticate the user as a registered user at step 530, a check is performed to determine whether a threshold number corresponding to the maximum number of authentication attempts has been exceeded at step 540. If the maximum number of authentication attempts has been exceeded, the method proceeds to an exit procedure at step 550. The exit procedure may redirect the user, for example, to a pre-determined web page or to a web page corresponding to the captured URL. If at step 540 the threshold has not been exceeded, the bookmarking and tagging service provider may present the user with a login/register page at step 560, where the user may supply identifying information and authentication credentials via a login procedure, or alternatively, where the user may register for an account. For example, user information may include, but is not limited to, a user ID, a client device ID, a password, public key, or other identifying information.

The bookmarking and tagging service provider may receive identifying information and authentication credentials from a user via a form on a web page, for example, or by accessing such information from a physical token such as through a card reader or a biometric device coupled to the user's client device. After the bookmarking and tagging service provider receives identifying information and authentication credentials, the bookmarking and tagging service provider attempts to authenticate the user as a registered user again at step 530. This process loop is continued until an exit condition is reached at step 550 or until the bookmarking and tagging service provider successfully authenticates the user as a registered user.

At step 570, the bookmarking and tagging service provider captures user information from the authentication step 530. For example, user information may include, but is not limited to, a user ID, a client device ID, a password, public key, or other identifying information. User information may be captured, for example, by checking a cookie or certificate or by receiving information from a login or registration procedure. At step 570, for example, the bookmarking and tagging service provider may capture user information such as a user ID.

The bookmarking and tagging service provider receives bookmark information and tag information from a registered user and stores the received bookmark information and tag information along with the previously captured bookmark information such as the URL of the content item, step 580. For example, the bookmarking and tagging service provider may present the registered user with a form for entering both bookmark information, such as content descriptive information, and tag information. The bookmarking and tagging service provider associates the bookmarked content item, the bookmark information, and the tag information with the registered user and stores it in the bookmark and tag database.

Figure 6:
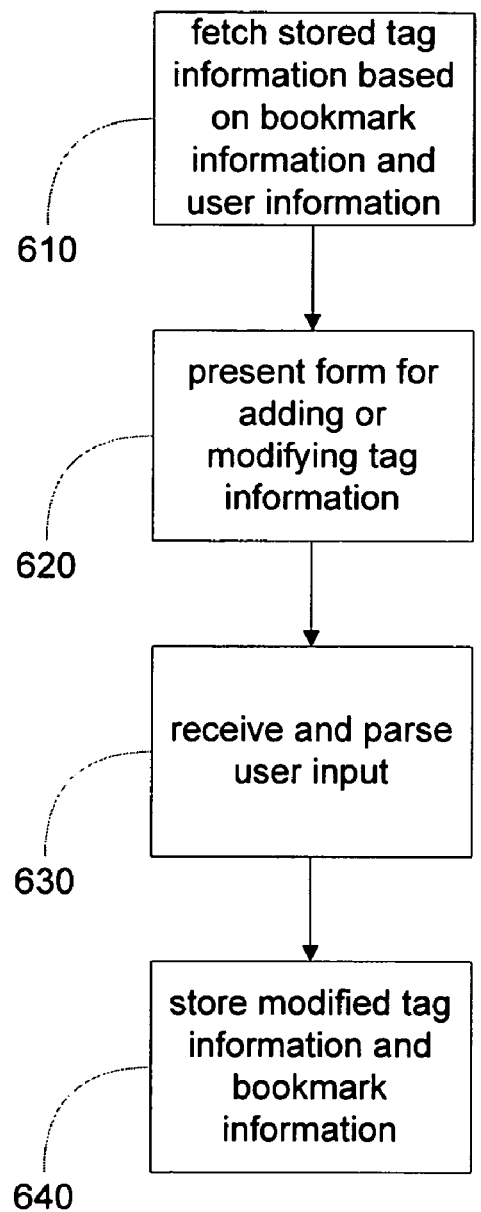
FIG. 6 is a flow diagram presenting a method for receiving and storing bookmark information and tag information according to one embodiment of the present invention.

FIG. 6 presents a flow diagram illustrating a method for receiving bookmark information and tag information from a registered user and storing received bookmark information and tag information associated with a bookmarked content item according to one embodiment of the present invention. According to the method of FIG. 6 a bookmarking and tagging service provider fetches stored tag information based on both bookmark information including, but not limited to, captured bookmark information such as the URL of the content item and captured user information, step 610. For example, the bookmark and tag database manager may access bookmark information and tag information previously stored in bookmark and tag database and fetch this bookmark information and tag information. The bookmark and tag database manager may retrieve bookmark information and tag information associated with a registered user and may also retrieve tag information from the tag space associated with the captured URL. The bookmark and tag information manager may issue commands to the bookmark and tag database manager to perform read and lookup functions in bookmark and tag database.

The bookmarking and tagging service provider presents a form for adding or modifying tag information, step 620. For example, the script manager may receive the fetched information from step 610 and process scripts for presenting a registered user with a form for adding or modifying tag information. Script handler may issue a command to HTTP preprocessor to dynamically create a form for entering tag information. The form may be partially filled in with information including captured bookmark information such as the URL of the content item captured during step 610 as well as tag information from the tag space associated with the content item.

The bookmarking and tagging service provider receives and parses user input, step 630. The script manager may process scripts for receiving and parsing user input. For example, the script handler may issue commands to the I/O manager and text parser to receive user input and parse text and to pass received and parsed text to the script handler. The script handler may use parsed text from user input and issue commands to process scripts for pattern matching and text-predictive procedures including, but not limited to, pattern matching and text-predictive procedures. The script handler may pass received input that is processed and parsed from a registered user's input during step 630 to the tag logic manager. The tag logic manager may suggest tag information and the bookmark and tag manager may pass the suggested tag information to the script manager. The script manager may then process the suggested tag information and present it to the registered user. For example, the script handler may pass the suggested tag information to the I/O manager and text parser, which may format the output for display on the registered user's client device.

The bookmarking and tagging service provider stores the modified tag information and the bookmark information, step 640. For example, the script manager may issue commands to the bookmark and database manager to store the modified tag information and the bookmark in the bookmark and tag database. The bookmark and tag information manager may receive the modified bookmark information and tag information from the script manager and associate the modified bookmark and tag information with the registered user. The bookmark and tag information manager may pass the modified bookmark information and tag information associated with the registered user to the bookmark and tag database manager and issue commands to perform write functions in the bookmark and tag database.

Figure 7:
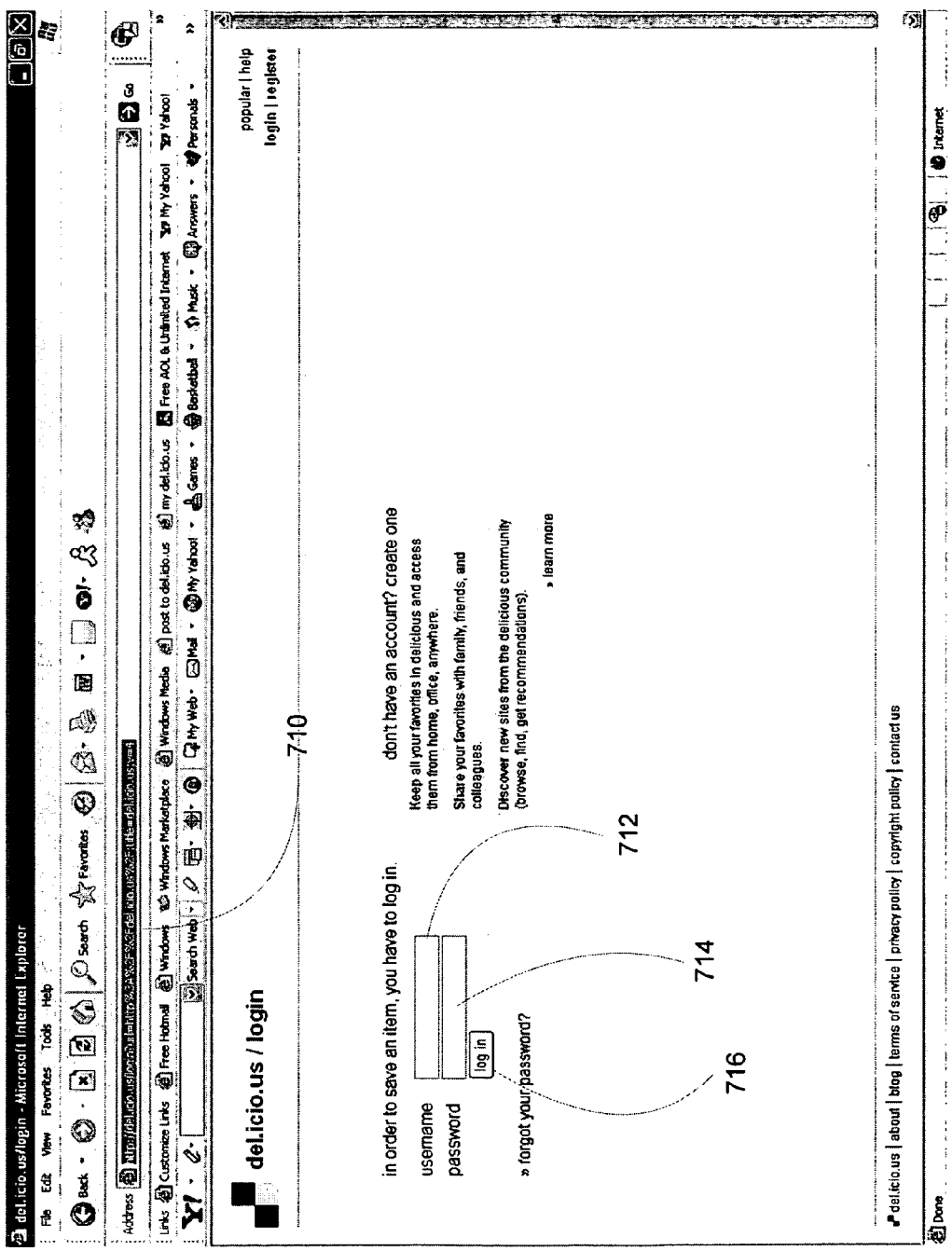
FIG. 7 is a screen diagram presenting a user interface for logging in to a bookmarking and tagging service provider or registering for an account with a bookmarking and tagging service provider according to one embodiment of the present invention.

FIG. 7 presents a screen diagram illustrating a login/registration page presented to a user who makes a bookmarking and tagging request to bookmark a content item prior to authentication of the user as a registered user of a bookmarking and tagging service provider. Prior to authenticating a user making a request to bookmark a content item, the bookmarking and tagging service provider may capture bookmark information, such as content identifying information, associated with the content item. According to FIG. 7, the bookmarking and tagging service provider may capture content identifying information, such as the URL 710 of the content item the user wishes to bookmark. Users who are not logged into the bookmarking and tagging service provider provide username 712 and password 714 credentials, which the user submits to the service provider upon selection of a control 716. Selection of the control 716 allows the service provider to validate or otherwise authenticate the user, allowing for the creation of a bookmark for the content items address that is encoded in the URL 710.

Figure 8:
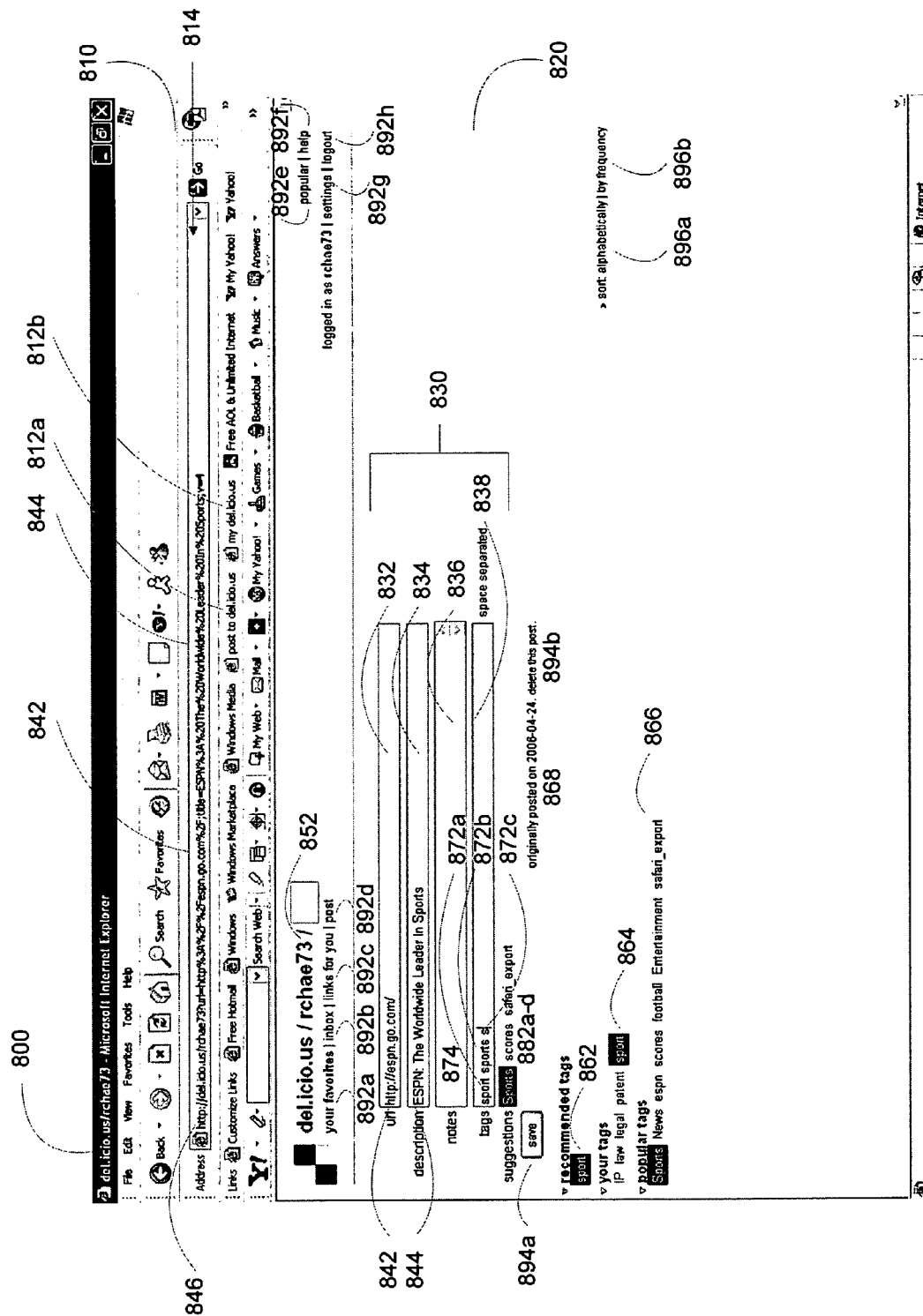
FIG. 8 is a screen diagram presenting a user interface for bookmarking a content item and entering tag information related to a bookmarked content item according to one embodiment of the present invention.

FIG. 8 presents a screen diagram illustrating a user interface for entering tag information related to a bookmarked content item and associated with bookmark information and a registered user according to one embodiment of the present invention. According to FIG. 8, an application area 800 comprises a control area 810 and data area 820. In the exemplary embodiment shown in FIG. 8, application area 800 is a web browser window in a windowed environment. Control area 810, as shown in FIG. 8, is a web browser toolbar, while data area 820 is shown as a web page. Control area 810 further comprises browser buttons 812a and 812b and address bar 814. In the exemplary embodiment of FIG. 8, data area 820 further comprises form 830, captured information 840, user information 850, retrieved information 860, user-defined information 870, generated information 880, and controls 890.

Browser buttons 812a and 812b may be linked, for example, to HTTP requests to initiate a connection with a bookmark and tagging service provider or to run a script served by the bookmarking and tagging service provider. When a user clicks on browser button 812a, for example, the bookmark and tagging service provider receives a bookmarking and tagging request to bookmark a content item. In response to receiving the bookmarking and tagging request, the bookmarking and tagging service provider captures bookmark information, such as content identifying information, and also attempts to authenticate the user as a registered user. For example, the bookmarking and tagging service provider captures content identifying information such as the URL of the content item and also attempts to authenticate the user as a registered user. Once the bookmarking and tagging service provider authenticates the user as a registered user, the bookmark and tagging service provider presents in data area 820 a web page comprising form 830. Form 830 may further comprise, for example, form fields 832, 834, 836, and 838.

The bookmark and tagging service provider may also format and display captured information in data area 820. Captured information may comprise, for example, captured bookmark information, which may include content identifying information and content descriptive information associated with a content item. The bookmark and tagging service provider may capture, format, and display captured content identifying information 842, shown here as a URL, and captured content descriptive information 844, shown here as a title to a web page. The captured information 840 may be formatted and displayed as a captured information string 846, shown here displayed in address bar 814.

The bookmarking and tagging service provider may also display user information in data area 820. User information may include, but is not limited to, username 852. For example, the bookmarking and tagging service provider may receive user information including username 852 from an authentication, login, or registration procedure.

The bookmarking and tagging service provider may also format and display retrieved information in data area 820. Retrieved information may include, but is not limited to, bookmark information and tag information retrieved from a bookmark and tag database. For example, retrieved information may include recommended tags 862, user tags 864, popular tags 866, and bookmark posted information 868. Recommended tags 862 may correspond, for example, to tag information associated with the tag space for a bookmarked content item. Alternatively, recommended tags 862 may correspond to tag information associated with a tag dictionary. User tags 864 corresponds to tag information associated with a registered user's tag collection, while popular tags 866 corresponds to tag information associated with the tag space for a bookmarked content item across all registered users. Bookmark posted information 868 corresponds to information relating to whether a user has previously bookmarked a particular content item.

The bookmarking and tagging service provider may also receive and display user-defined information from the registered user. User-defined information may include, but is not limited to, user-defined bookmark information and user-defined tag information. The bookmarking and tagging service provider may receive user-defined information 870 from a registered user, for example, when the registered user inputs user-defined information 870 in form fields 832, 834, 836, and 838. As shown in FIG. 8, user-defined information 870 includes user-defined bookmark information such as notes 874 as well as user-defined tag information such as tag 872a, tag 872b, and tag 872c.

The bookmarking and tagging service provider may also format and display generated information in data area 820. Generated information may include, but is not limited to, tag information generated by a tag logic manager in response to receiving user-defined information such as partially entered tag information. For example, in response to receiving partially-entered tag information, the bookmarking and tagging service provider may issue commands to a tag logic manager to execute a pattern-matching or a text-predictive procedure in order to generate tag suggestions 882a, 882b, 882c, and 882d. As shown in FIG. 8, for example, a tag logic manager may generate tag suggestions 882a, 882b, 882c, and 882d in response to the bookmarking and tagging service provider receiving tag 872c, shown as a partially-entered tag.

The bookmarking and tagging service provider may also display various controls in data area 820. Controls may include, but are not limited to, buttons and hyperlinks, which may be linked to HTTP requests or to scripts served by a bookmarking and tagging service provider. As shown in FIG. 8, for example, controls include navigation controls 892, bookmark controls 894, and display controls 896. Navigation controls 892 may include, for example, navigation control links 892a, 892b, 892c, 892d, 892e, 892f, 892g, and 892h. Navigation controls 890 may be linked to HTTP requests or to scripts served by a bookmarking and tagging service provider to control navigation, for example, to various web pages dynamically created for an individual registered user of a bookmarking and tagging service provider. For example, navigation control link 892d allows a registered user to navigate to a dynamically-created web page which allows a registered user to bookmark a content item, while navigation control link 892h allows a registered user to logout of the bookmarking and tagging service provider.

Bookmark controls 894 may be linked to HTTP requests or scripts served by a bookmarking and tagging service provider for controlling actions to bookmarks. For example, bookmark control button 894a may be linked to an HTTP request or script served by a bookmarking and tagging service provider to save a bookmark, which comprises bookmark information comprising captured URL 844, captured web page description 846 along with the related tag information comprising entered tags 872a, 872b, and 872c. Bookmark control link 894b may be linked to an HTTP request or script served by a bookmarking and tagging service provider to delete the bookmark. Display controls 896 may be linked to HTTP requests or scripts served by a bookmarking and tagging service provider for formatting the display of retrieved information 860 on a generating dynamically-created web pages displayed in client area 820.

Figure 9:
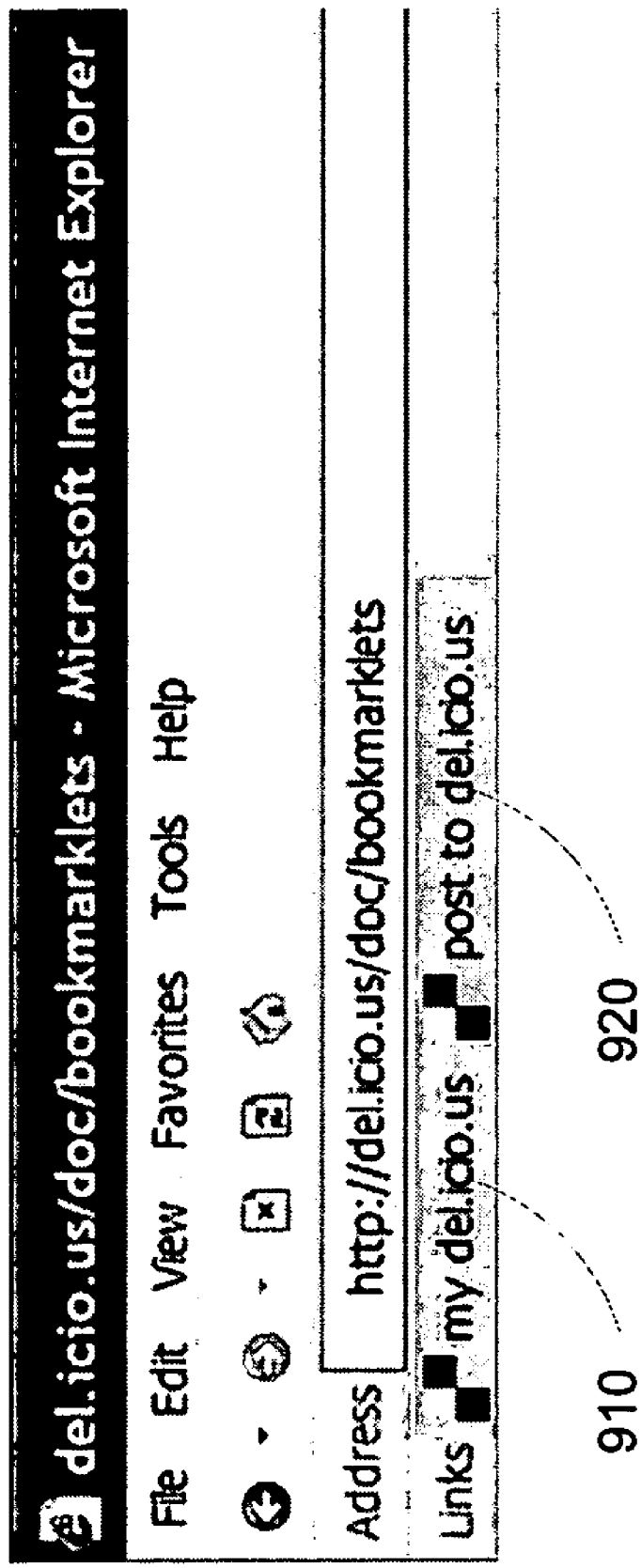
FIG. 9 is a screen diagram illustrating buttons that allow a user to generate a bookmarking and tagging request according to one embodiment of the present invention.

FIG. 9 presents a screen diagram illustrating browser buttons that may be added to a browser, web page or other content item to allow a user to generate a bookmarking and tagging request according to one embodiment of the present invention. FIG. 9 shows browser buttons 910 and 920, which may be added to a web browser. A bookmarking and tagging service provider may receive a bookmarking and tagging request to bookmark a content item, for example, when a user clicks on a browser button 920. Browser button 920 may be linked to an HTTP request to initiate a connection with the bookmarking and tagging service provider or to run a script served by the bookmarking and tagging service provider. For example, when a user clicks on browser button 920, a book-marking and tagging service provider may receive an HTTP request to initiate a connection with the bookmarking and tagging service provider located at the web address http://del.icio.us in order to bookmark the content item.

One embodiment of an exemplary HTTP request is illustrated in Table A:

TABLE A

<a href="http://del.icio.us/post" onclick=
"window.open('http://del.icio.us/post?
v=4&noui&jump=close&url='+encodeURIComponent(location.href)+
'&title='+encodeURIComponent
(document.title), 'delicious','toolbar=no,width=700,height=400');
return false;"> Save This Page</a>

The sample code fragment of Table A, which may be linked to a browser button or added by a content provider to a web page containing a content item, allows a user to generate an HTTP request to initiate contact with a bookmarking and tagging service provider to generate a bookmarking and tagging request to bookmark a content item according to one embodiment of the present invention. The HTML code of Table A includes JavaScript commands to initiate a connection with a bookmarking and tagging service provider in order to generate a bookmarking and tagging request to bookmark a content item. The HTML code may be linked to a browser button to allow a user to generate an HTTP request to initiate a connection with a bookmarking and tagging service provider to generate a bookmarking and tagging request to bookmark a content item. Alternatively, a content provider may add the HTML code to a web page containing a content item. The content provider may link a graphic button or hyperlink to HTML code so that when a user clicks on the graphic button or hyperlink, an HTTP request is generated to initiate a connection with a bookmarking and tagging service provider in order to bookmark the content item.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

I claim:

1. A method for saving and tagging a content item available on a computer network, the method comprising:
   generating a tag space for a content item including a plurality of tag information associated with the content item across a plurality of users;
   navigating to the content item available over a computer network, the content generated by an author;
   receiving a request to save a bookmark to the content item;
   suggesting tag information that is related to the bookmarked content item based on the plurality of tag information from the tag space of the bookmarked content item;
   receiving one or more items of user-generated tag information that are related to the bookmarked content item, the user-generated tag information generated by one or more users who are not the author and selected from the suggested tag information; and
   saving the bookmarked content item in conjunction with the one or more items of user-generated tag information, the one or more items of user-generated tag information associated with the tag space of the bookmarked content item.

2. The method of claim 1 wherein navigating comprises utilizing a browser to navigate to an address that identifies the location of the content item.

3. The method of claim 2 wherein receiving a request to save a bookmark to the content item comprises receiving a request to save a bookmark to the content item based upon the selection of a browser control.

4. The method of claim 1 wherein receiving a request to save a bookmark to the content item comprises receiving a request to save a bookmark to the content item based upon the selection of a control presented as part of the content item.

5. The method of claim 1 wherein receiving a request to save a bookmark to the content item comprises receiving an address of the content item to a bookmarking and tagging service provider for storage.

6. The method of claim 1 wherein receiving a request to save a bookmark to the content item comprises receiving a URL that identifies the content item to a bookmarking and tagging service provider for storage.

7. The method of claim 1 wherein receiving one or more items of tag information comprises receiving one or more items of tag information that describe the related content item.

8. The method of claim 1 comprising:
receiving authentication information that identifies a user;
if the authentication information that identifies the user is valid, providing the user with access to a bookmarking and tagging service provider; and
if the authentication information that identifies the user is no valid, preventing the user from access to the bookmarking and tagging service provider.

9. The method of claim 8 wherein saving comprises saving in conjunction with information that identifies an account for the user.

10. The method of claim 1 wherein receiving a request to save a bookmark to the content item comprises encoding a URL for the content item into a URL that identifies a bookmarking and tagging service provider.

11. The method of claim 10 comprising parsing the encoded URL at the bookmarking and tagging service provider for storage.

12. The method of claim 1 comprising:
receiving a portion of an item of tag information; and
providing one or more suggested items of tag information on the basis of the received portion.

13. The method of claim 1 comprising:
suggesting one or more items of tag information; and
selecting a given one of the one or more items of tag information.

14. The method of claim 13 wherein suggesting comprises suggesting one or more items of tag information previously provided by a user.

15. The method of claim 1 comprising:
providing description information with regard to the content item; and
saving the description information in conjunction with the bookmarked content item and one or more items of tag information.

16. The method of claim 15 wherein providing comprises extracting the description information from the content item.

17. The method of claim 1 comprising:
providing notes information with regard to the content item; and
saving the notes information in conjunction with the bookmarked content item and one or more items of tag information.

18. The method of claim 1 wherein navigating to a content item comprises navigating to a web page.

19. The method of claim 1 wherein suggesting comprises suggesting a popular tag.

20. A system for saving and tagging a content item available on a computer network, the system comprising:
a client device operative to navigate to a content item available over a computer network and provide a control to generate a request to bookmark the content item, the content generated by an author;
a bookmarking and tagging service provider operative to:
generate a tag space for the content item including a plurality of tag information associated with the content item across a plurality of users;
suggest tag information that is related to the bookmarked content item based on the plurality of tag information from the tag space of the content item;
receive the bookmark request from the client device and one or more items of user-generated tag information that are related to the content item, the user-generated tag information generated by one or more users who are not the author and selected from the suggested tag information; and
a bookmark and tag data store operative to:
store a bookmark for the content item in conjunction with the one or more items of user-generated tag information, the one or more items of user-generated tag information associated with the tag space of the content item.

21. The system of claim 20 wherein the bookmark and tag data store is a relational database.

22. The system of claim 20 wherein the client device comprises a web browser to navigate to a content item.

23. The system of claim 20 wherein the client device utilizes an address to navigate to the content item.

24. The system of claim 23 wherein the client encodes the address of the content item in the bookmark request.

25. The system of claim 24 wherein the bookmarking and tagging service provider parses the bookmark request to retrieve the address of the content item for storage in the a bookmark and tag data store.

26. The system of claim 23 wherein the address is a Uniform Resource Locator ("URL").

27. The system of claim 20 wherein the bookmarking and tagging service provider is operative to suggest one or more items of tag information in response to the receipt of one or more items of tag information.

28. The system of claim 20 wherein the bookmarking and tagging service provider is operative to suggest one or more items of tag information on the basis of the content item.

29. The system of claim 20 wherein the bookmarking and tagging service provider is operative to suggest one or more items of tag information on the basis one or more items of tag information associated with the content item.

30. The system of claim 20 wherein the content item is a web page.

* * * * *